US007203222B1

(12) United States Patent
Conroy et al.

(10) Patent No.: US 7,203,222 B1

(45) Date of Patent: Apr. 10, 2007

(54) MULTIPLEXED ADC FOR A TRANSCEIVER

(75) Inventors: Cormac Conroy, Sunnyvale, CA (US); Beomsup Kim, Cupertino, CA (US); Ozan E. Erdogan, Campbell, CA (US)

(73) Assignee: Qualcomm, Incorporated, San Diego, CA (US)

( * ) Notice: Subject to any disclaimer, the term of this patent is extended or adjusted under 35 U.S.C. 154(b) by 902 days.

(21) Appl. No.: 10/219,057

(22) Filed: Aug. 14, 2002

(51) Int. Cl.
*H04B 1/38* (2006.01)

(52) U.S. Cl. ...................... 375/219; 375/308; 375/329; 455/303

(58) Field of Classification Search ................ 375/219, 375/222, 295, 316, 302, 308, 322, 329, 332, 375/340; 455/130, 296, 303
See application file for complete search history.

(56) References Cited

U.S. PATENT DOCUMENTS 5,051,929 A * 9/1991 Tutt et al. .................. 345/593
5,315,304 A * 5/1994 Ghaleb et al. .............. 342/165
5,361,099 A * 11/1994 Kim ........................... 348/555
5,381,446 A * 1/1995 McIntosh .................... 375/150
5,469,115 A * 11/1995 Peterzell et al. ............ 330/129
2005/0107059 A1* 5/2005 Lehning et al. ............. 455/303

* cited by examiner

*Primary Examiner*—Pankaj Kumar
*Assistant Examiner*—Naheed Ejaz
(74) *Attorney, Agent, or Firm*—Thomas R. Rouse; Charles D. Brown; Kenyon S Jenckes

(57) ABSTRACT

A transceiver used in a communications system includes a transmitter having a transmit input that is split into a transmit I component and a transmit Q component; a receiver having a receive input that is split into a receive I component and a receive Q component; a switching network configured to input the transmit I component, the transmit Q component, the receive I component and the receive Q component; and to output a sampled sequence; an analog to digital converter configured to receive the sampled sequence and to output a digitized data stream; and a digital signal processor configured to receive the digitized data stream and process the digitized data stream.

7 Claims, 8 Drawing Sheets

DSP
235
232
ADC
230
228
S/H
220
225
phase shifter
210
Local Oscillator
215
200
205
Rx

S/H
300
S/H
305
ADC
310
DSP
315
320
325

I
Q
I
Q
I
Q
select signal
I
Q

Rxon
Txon

MULTIPLEXED ADC FOR A TRANSCEIVER

FIELD OF THE INVENTION

The present invention relates generally to analog to digital converters (ADCs). More specifically, the design of an ADC used in a communication system is disclosed.

BACKGROUND OF THE INVENTION

In communication systems, modulation and demodulation involves changing a signal's amplitude, frequency, and/or phase. For the ease of characterizing these properties, as well as to facilitate the implementation of the modulation and demodulation circuitry, the signal is commonly expressed as a vector with rectangular coordinates of I (in-phase) and Q (quadrature). Thus, transceiver designs frequently involve ways to process the I and Q components separately.

Note that in the following discussion, the transmitters and receivers described can be both stand-alone components and transmitter/receiver portions of transceivers. FIG. 1 is a block diagram illustrating a receiver that processes I and Q signal components. A local oscillator (LO) 115 generates a radio frequency (RF) signal that runs at the carrier frequency. Mixer 105 mixes the RF signal with the receiver input, Rx, to produce the I component of the intermediate frequency (IF) signal. At the same time, phase shifter 110 shifts the phase of the RF signal by 90°. The phase shifted signal is mixed with the receiver input by mixer 100 to produce the Q component of the IF signal. ADCs 125 and 120 convert the I and Q components to digital, and the digitized signals are sent to DSP 130 for further processing.

In the receiver design disclosed above, two ADCs are needed to convert the two components of the IF signal. It is desirable to reduce the number of ADCs to achieve a simpler transmitter design that is cheaper to produce, consumes less power, and is smaller in area In existing transmitter designs, the input of the transmitter comes from the output of an external source. The external source, such as a baseband modem, traditionally produces analog outputs. As a result, most of the transmitters are designed to do modulation and processing in analog domain. As digital modulation and demodulation techniques become more popular because of their robustness and flexibility, it is desirable to convert the analog inputs to digital, and then do the modulation and filtering in the digital domain. Furthermore, it is desirable to reduce the number of ADCs needed to convert the I and Q components of the input in the transmitter.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A transceiver with multiplexed ADC design is disclosed. In one embodiment, the transmitter and the receiver of the transceiver each has one ADC that multiplexes between the I and Q components of the inputs. In another embodiment, the transmitter and receiver of the transceiver share a single ADC that multiplexes between the I and Q components of the inputs. One or more digital signal processors (DSPs) are used to modulate or demodulate the signals.

Figure 1:
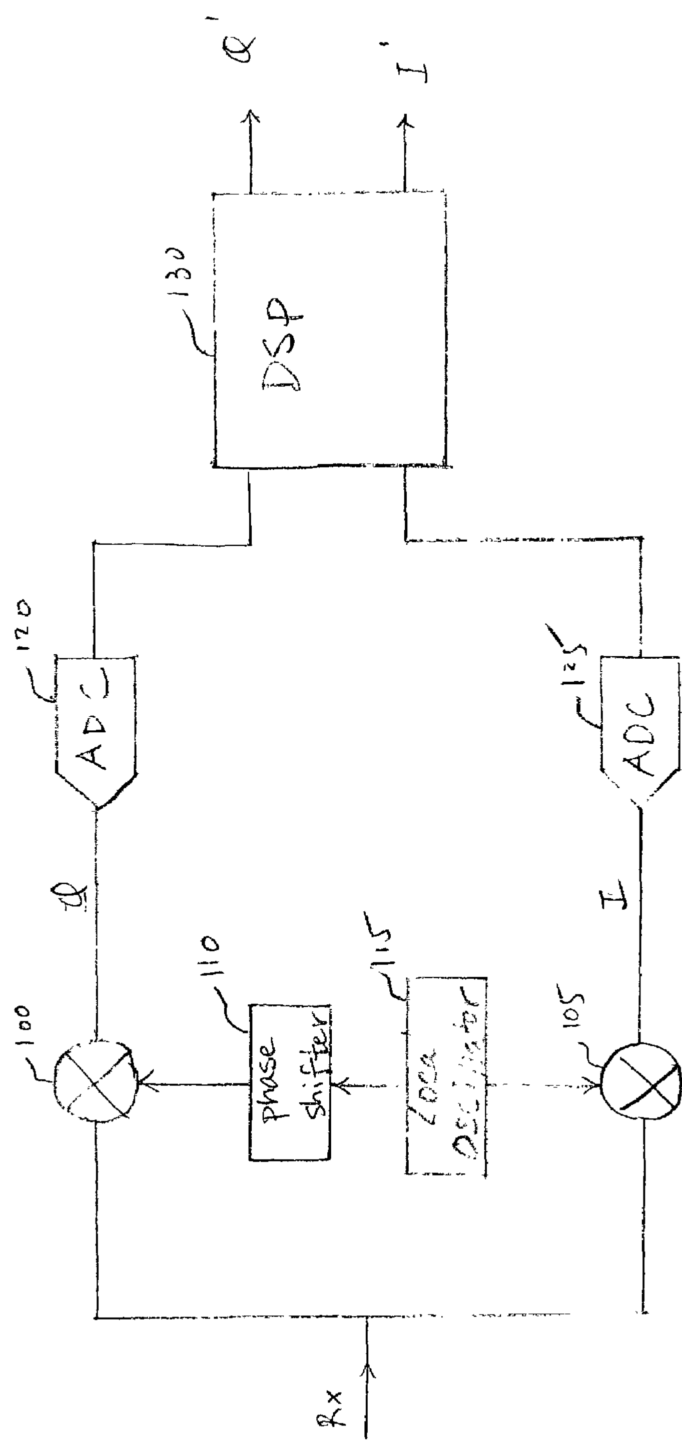
FIG. 1 is a block diagram illustrating a receiver that processes I and Q signal components.
Figure 2:
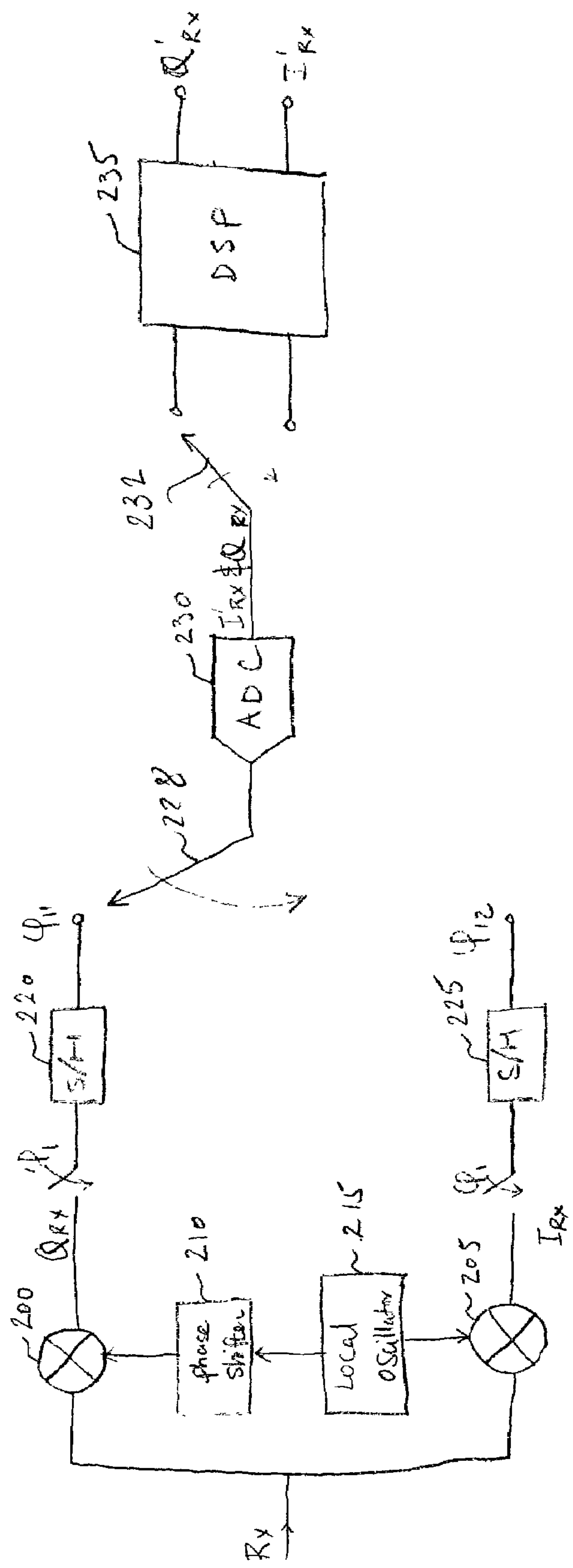
FIG. 2 is a block diagram illustrating one embodiment of a receiver with an ADC that is configured to multiplex between the I and Q components.

FIG. 2 is a block diagram illustrating one embodiment of a receiver with an ADC that is configured to multiplex between the I and Q components. A local oscillator (LO) 215 generates a radio frequency (RF) signal that runs at the carrier frequency. Mixer 205 mixes the RF signal with the receiver input, Rx, to produce the I component of the intermediate frequency (IF) signal. At the same time, phase shifter 210 shifts the phase of the RF signal by 90°. The phase shifted signal is mixed with the receiver input by mixer 200 to produce the Q component of the IF signal.

The I and Q components of the IF signal, $I_{Rx}$ and $Q_{Rx}$, are sampled simultaneously at time $\phi_1$ by sample and hold (SH) modules 220 and 225. Sample and hold module 220 holds the sampled $Q_{Rx}$ value for a fixed amount of time after sampling. Sample and hold module 225 also holds the sampled $I_{Rx}$ value for a fixed amount of time. ADC 230 toggles between the two sample and hold outputs via a switch 228 that is connected to the ADC, at times $\phi_{11}$ and $\phi_{12}$. The selected value is input into ADC 230, which produces a data stream that interleaves digitized $I_{Rx}$ and $Q_{Rx}$. The output of the ADC is connected to a timed switch 232 that toggles between the two inputs of DSP 235 to recover the digitized $I_{Rx}$ and $Q_{Rx}$ components. DSP 235 demodulates each of the components separately and filters the results. The resulting baseband signal is output for further processing by other parts of the device.

Figure 3:
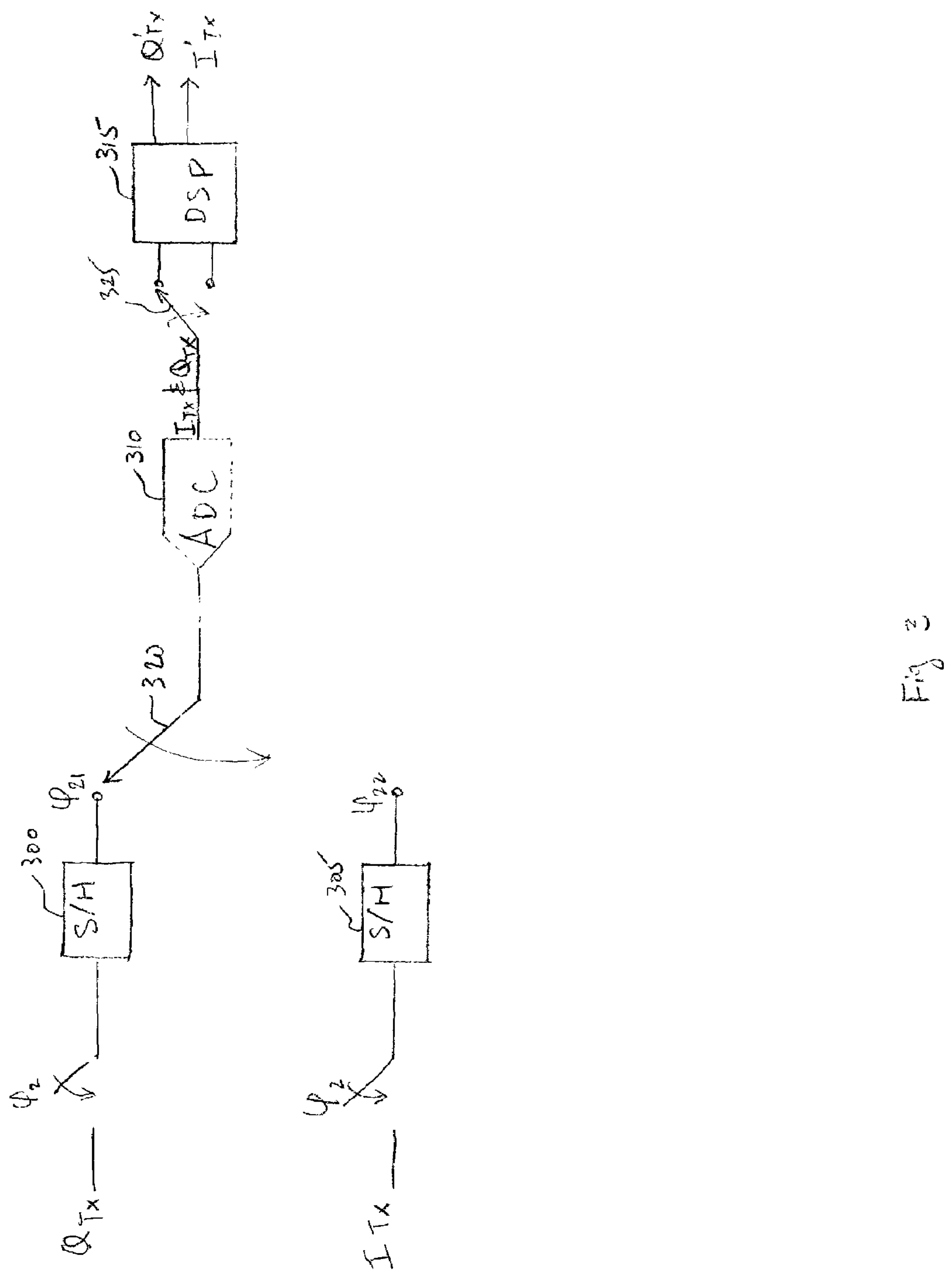
FIG. 3 is a block diagram illustrating one embodiment of a transmitter with an ADC configured to multiplex between the I and Q components.

FIG. 3 is a block diagram illustrating one embodiment of a transmitter with an ADC configured to multiplex between the I and Q components. In this embodiment, the inputs to the transmitter are analog outputs of a baseband modem (not shown), which are already split into a transmit I component, $I_{Tx}$, and a transmit Q component, $Q_{Tx}$. The two components are sampled simultaneously at time $\phi_2$ by sample and hold modules 300 and 305. Sample and hold module 300 holds the sampled $Q_{Tx}$ value after sampling and sample and hold module 305 holds the sampled $I_{Tx}$ value. ADC 310 toggles between the two sample and hold outputs via a switch 320 that is connected to the ADC, at times $\phi_{21}$ and $\phi_{22}$. The selected value is input into ADC 310, which produces a data stream that interleaves digitized $I_{Tx}$ and $Q_{Tx}$. The output of the ADC is connected to a timed switch 325 that toggles between the two inputs of DSP 315 to recover the digitized $I_{Tx}$ and $Q_{Tx}$ components. DSP 315 modulates and processes the signals, and its outputs are amplified and transmitted by other parts of the device. In this embodiment, the DSP directly modulates the inputs and no additional mixing is necessary. Note that the outputs of the DSP in this embodiment are two processed I and Q components, whereas in other embodiments, the output may be a single signal that combines I and Q.

The transmitter and the receiver designs described above can be combined to produce a transceiver. The transceiver may employ one or more DSPs for modulating, demodulating, filtering and other related processing of the signals.

Figure 4:
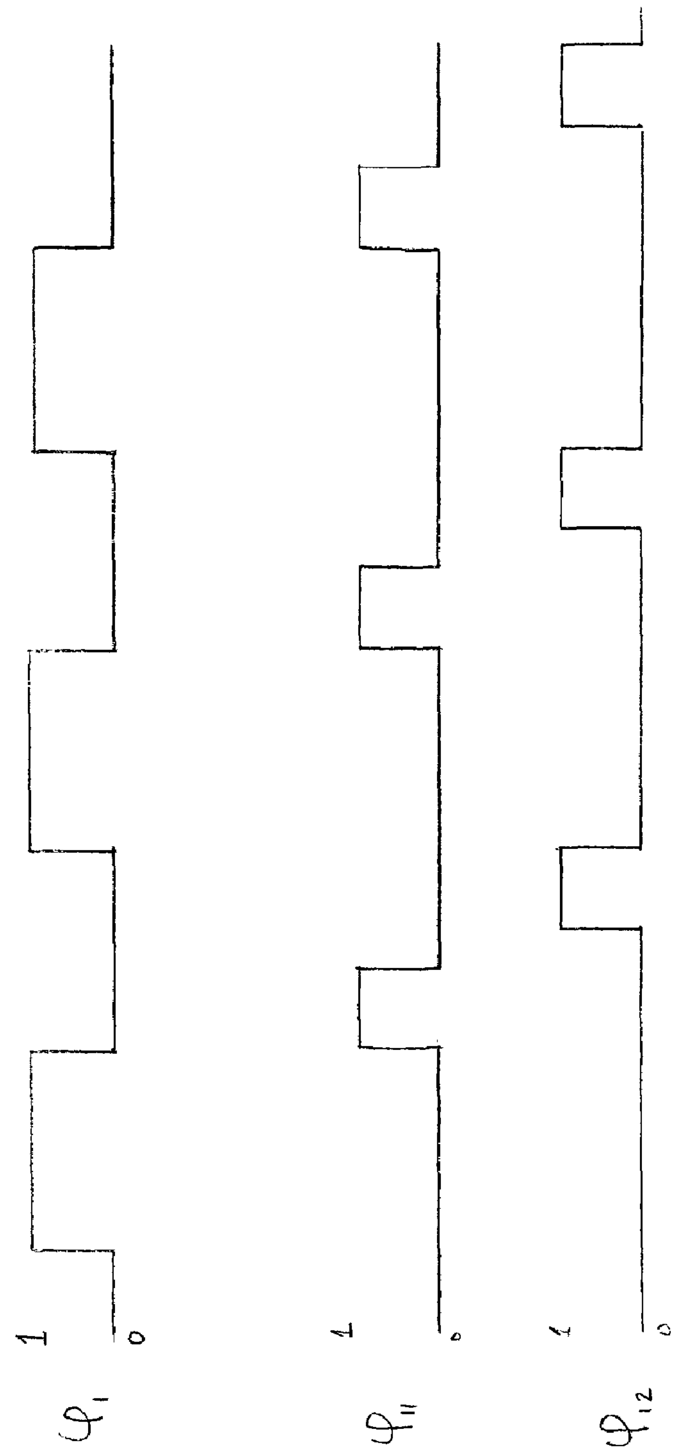
FIG. 4 is a timing diagram for the ADC input of the receiver shown in FIG. 2.

FIG. 4 is a timing diagram for the ADC input of the receiver shown in FIG. 2. The timing diagram for the ADC input for the transmitter shown in FIG. 3 is similar. The top graph shows the timing that corresponds to $\phi_1$ from FIG. 2. The second graph shows the timing that corresponds to $\phi_{11}$, and the third graph shows the timing that corresponds to $\phi_{12}$.

The sample and hold for the receiver takes place when $\phi_1$ is on. After the completion of sample and hold, $\phi_1$ is off and $\phi_{11}$ is on. Switch 228 selects the sampled $Q_{Rx}$ value and inputs it to ADC 230. After that, $\phi_{12}$ is on, and the switch selects the sampled $I_{Tx}$ value and inputs it to ADC 230. When $\phi_{12}$ is off, $\phi_1$ is on and the cycle repeats again. Because of the time multiplexing of the ADC's input, the ADC has an output data stream that interleaves the digitized receive I and Q components.

Figure 5:
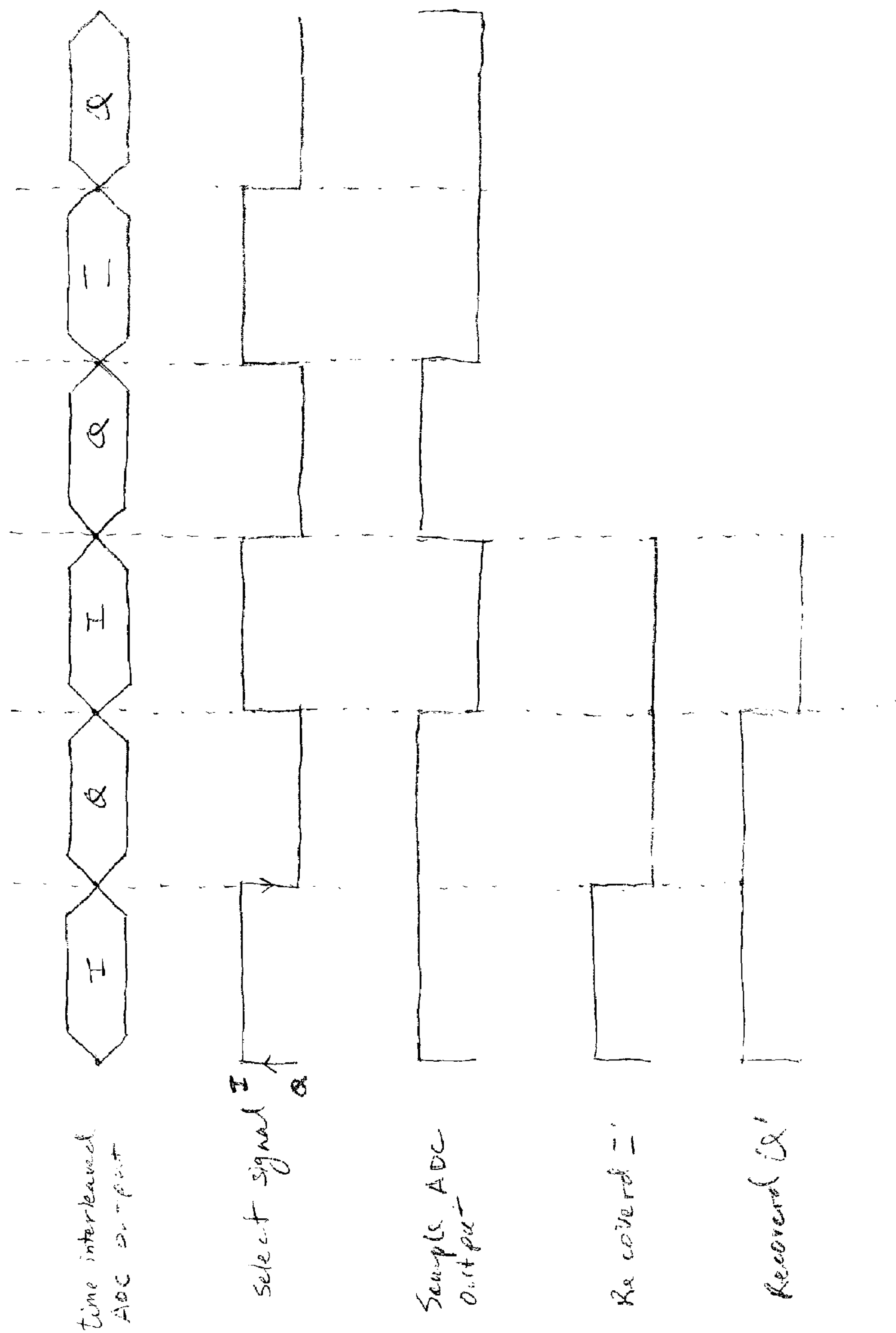
FIG. 5 is a timing diagram illustrating the recovery of I and Q components from the ADC output of a transmitter with a multiplexed ADC.

FIG. 5 is a timing diagram illustrating the recovery of I and Q components from the ADC output of a transmitter with a multiplexed ADC. The I and Q components from the ADC output of the receiver are recovered in a similar manner. The first graph illustrates the ADC output of the transmitter, which has the I and Q signals interleaved in time. During one clock cycle, the ADC outputs the value for digitized I component, and then the value for digitized Q component. The interleaved output is recovered using a select signal that is illustrated in the second graph. The select clock signal, which runs at a clock rate that is equivalent to the ADC's output, is used to time the toggling of switch 232 in FIG. 2 or switch 325 in FIG. 3 to reconstruct the digitized I and Q components. In one embodiment, the switch selects I on the rising clock edge of the select signal, and Q on the falling clock edge of the select signal. In other embodiments, the clock edge choice may be reversed. The resulting reconstructed digitized I and Q signals are used by the DSP for further processing.

The third graph shows an example of a possible output from a one bit ADC. Over a period of 3 clock cycles, the output is a bit sequence of 110100 that interleaves the values for I and Q. Thus, the signals for I and Q can be reconstructed by extracting every other bit from the sequence. The fourth graph is the reconstructed I signal. The fifth graph is the reconstructed Q signal.

Figure 6:
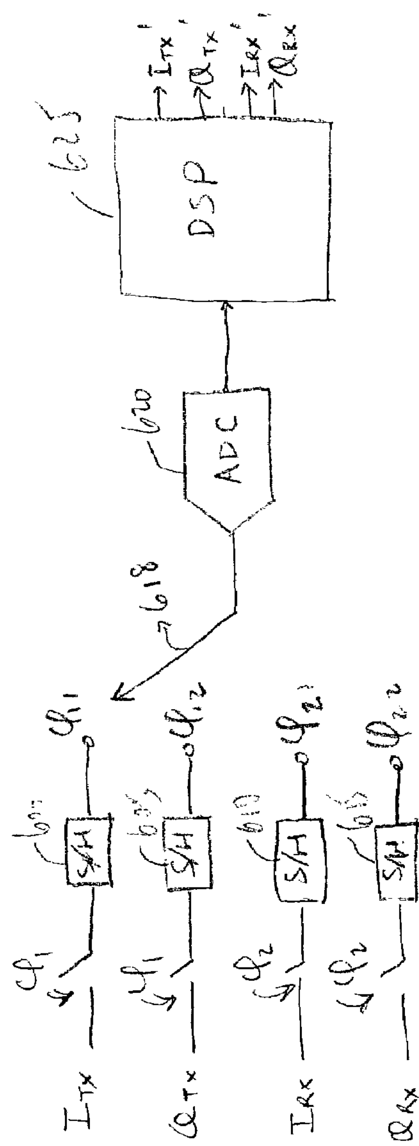
FIG. 6 illustrates one embodiment of a transceiver that uses a single ADC.

The transceiver can be further simplified by sharing a single ADC between transmit and receive signals. FIG. 6 illustrates one embodiment of a transceiver that uses a single ADC. Two components of the signal to be transmitted, $I_{Tx}$ and $Q_{Tx}$, are sampled simultaneously at time $\phi_1$ by two sample and hold modules associated with the transmitter, 600 and 605. Two components of received signal, $I_{Rx}$ and $Q_{Rx}$, are sampled simultaneously at time $\phi_2$ by two sample and hold modules associated with the receiver, 610 and 615. The sampled values are held in the sample and hold modules until the next sampling period. A switch 618 selects among the four sample and hold outputs to produce an output signal that interleaves the sampled inputs. The sample and holds and the switch form a switching network that provides the input to the ADC.

In one embodiment where the transceiver system is time division multiplexed (TDM), the switch selects between the outputs of sample and hold 600 and 605 during the transmit cycle, at times $\phi_{11}$ and $\phi_{12}$. During the receive cycle, it selects between the outputs of sample and hold 610 and 615, at times $\phi_{21}$ and $\phi_{22}$. The selected value is input into ADC 620, which produces a data stream that interleaves the digitized data. Switch DSP 625 reconstructs each of the signal components from the interleaved data stream, and processes each of the components separately.

Figure 7:
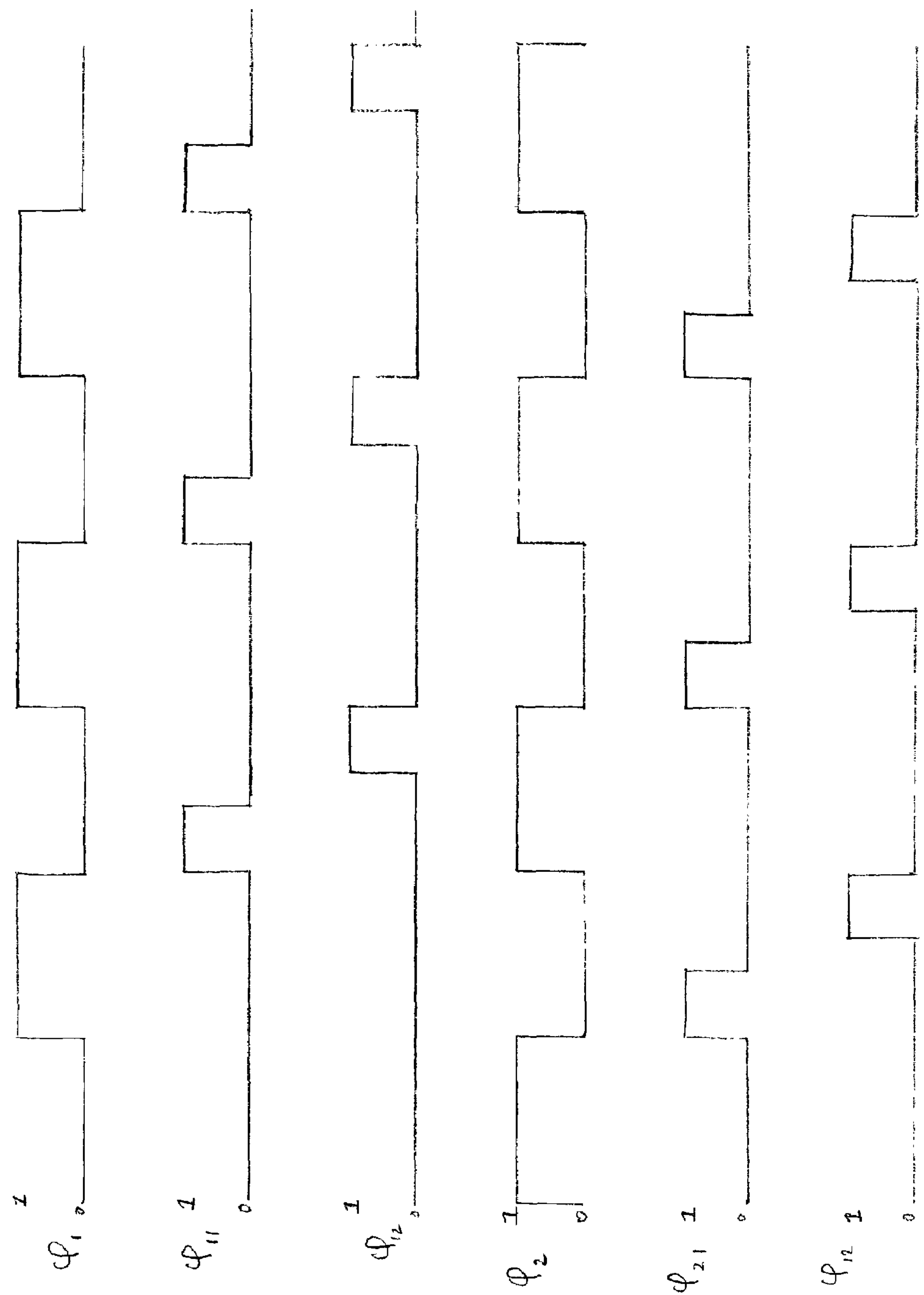
FIG. 7 is a timing diagram for the ADC input of the transceiver shown in FIG. 6 where the transmitter and receiver share a single ADC.

FIG. 7 is a timing diagram for the ADC input of the transceiver shown in FIG. 6 where the transmitter and receiver share a single ADC. As noted above, in other embodiments, the transmitter I and Q channels may share an ADC without the receiver, or the receiver I and Q channels may share an ADC without the transmitter. The top graph shows the timing that corresponds to $\phi_1$; the second graph shows the timing that corresponds to $\phi_{11}$; and the third graph shows the timing that correspond to $\phi_{12}$.

The sample and hold for the receiver takes place when $\phi_1$ is on. After the completion of sample and hold, $\phi_1$ is off and $\phi_{11}$ is on. Switch 618 selects the sampled $Q_{Tx}$ value and inputs it to ADC 620. After that, $\phi_{12}$ is on, and the switch selects the sampled $I_{Tx}$ value and inputs it to ADC 620. When $\phi_{12}$ is off, $\phi_1$ is on and the cycle repeats again.

Similarly, the sample and hold for the transmitter takes place when $\phi_2$ is on. After the completion of sample and hold, $\phi_2$ is off and $\phi_{21}$ is on. Switch 618 selects the sampled $Q_{Tx}$ value and inputs it to ADC 620. After that, $\phi_{22}$ is on, and the switch selects the sampled $I_{Tx}$ value and inputs it to ADC 620. When $\phi_{12}$ is off, $\phi_1$ is on and the cycle repeats again. ADC 620 produces an output data stream that interleaves the digitized transmitter I and Q components with the digitized receiver I and Q components.

Figure 8:
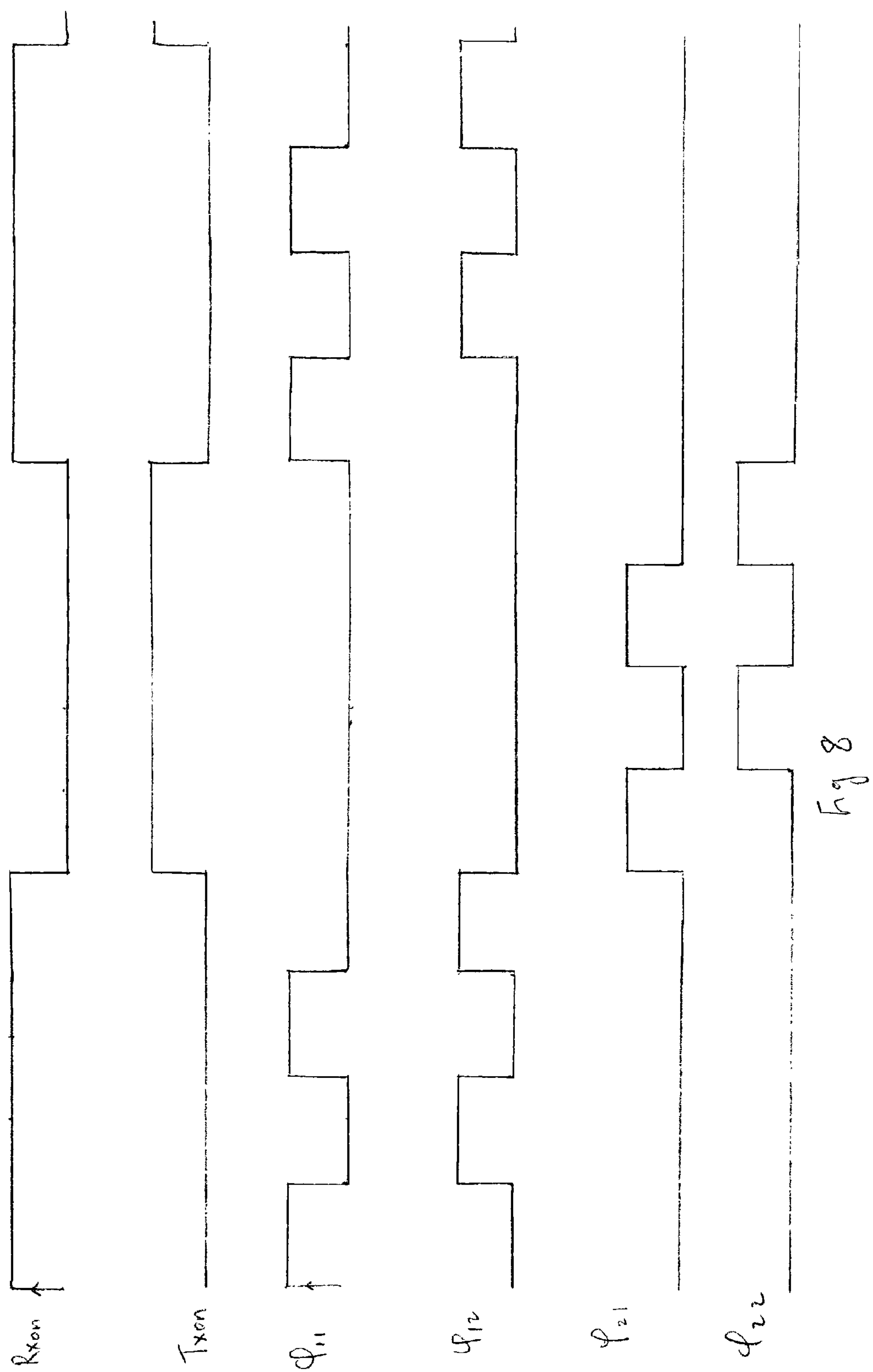
FIG. 8 is an alternative timing diagram for a transceiver as shown in FIG. 6 where the ADC produces an output data streams that interleaves groups of transmitter I and Q components with groups of receiver I and Q components.

FIG. 8 is an alternative timing diagram for a transceiver as shown in FIG. 6 where the ADC produces an output data stream that interleaves groups of transmitter I and Q components with groups of receiver I and Q components. The first graph shows the timing for a signal $Rx_{on}$, which is on when the transceiver is in receive mode. The second graph shows the timing for a signal $Tx_{on}$, which is on when the transceiver is in transmit mode. The transceiver may remain in one mode or the other for more than one sample and the time spent in each mode may vary. For the purpose of illustration, the example shows the transceiver in receive mode for 2 samples and then in transmit mode for 2 samples.

The rising edge of $Rx_{on}$ indicates that the transceiver is in receive mode. The ADC's input toggles between outputs of sample and hold 600 and sample and hold 605. Similarly, the rising edge of $Tx_{on}$ indicates that the transceiver is in transmit mode, and thus the ADC's input toggles between outputs of sample and hold 610 and sample and hold 615. The ADC produces an output that interleaves groups of digitized transmit and receive I and Q components.

A transceiver design has been disclosed. The transmitter design employs an ADC configured to multiplex between the I and Q components of the signal to be transmitted. The receiver design employs an ADC configured to multiplex between the I and Q components of the received signal. Alternatively, the transceiver may use a single ADC configured to multiplex between the I and Q components of the transmitted signal as well as the I and Q components of the received signal.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A transceiver used in a communications system comprising:

a transmitter having a transmit input that is split into a transmit I component and a transmit Q component;

a receiver having a receive input that is split into a receive I component and a receive Q component;

a switching network configured to input the transmit I component, the transmit Q component, the receive I component and the receive Q component; and to output a sampled sequence;

an analog to digital converter configured to receive the sampled sequence and to output a digitized data stream; and a digital signal processor configured to receive the digitized data stream and process the digitized data stream.

2. A transceiver as recited in claim 1 wherein the transmit I component and the transmit Q component are analog signals from a baseband modem output.

3. A transceiver as recited in claim 1 wherein the switching network comprises:

a plurality of sample and hold modules associated with the transmitter;

a plurality of sample and hold modules associated with the receiver; and a switch used to switch among the plurality of sample and hold modules associated with the transmitter and the plurality of sample and hold modules associated with the receiver.

4. A transceiver as recited in claim 1 wherein the switching network comprises a plurality of sample and hold modules for the transmitter and a plurality of sample and hold modules for the receiver wherein:

the plurality of sample and hold modules associated with the transmitter are used to sample the transmit I component and the transmit Q component simultaneously;

the plurality of sample and hold modules associated with the receiver are used to sample the receives I component and the receiver Q component simultaneously.

5. A transceiver as recited in claim 1 wherein the communication system is time division multiplexed.

6. A transceiver as recited in claim 1 wherein the digitized data stream sequentially interleaves sampled values of the transmit I component, the transmit Q component, the receive I component and the receive Q component.

7. A method to transmit and receive signals in a communications system comprising:

transmitting a transmit input that is split into a transmit I component and a transmit Q component;

receiving a receive input that is split into a receive I component and a receive Q component;

switching among the transmit I component, the transmit Q component, the receive I component and the receive Q component to produce an output of a sampled sequence;

converting the sampled sequence from analog to digital using an analog to digital converter configured to receive the sampled sequence and to output a digitized data stream; and processing the digital data stream using a digital signal processor.

* * * * *